(12) United States Patent
Derzsy et al.

(10) Patent No.: US 12,536,469 B2
(45) Date of Patent: Jan. 27, 2026

(54) AUTOMATING BIAS EVALUATION FOR MACHINE LEARNING PROJECTS

(71) Applicant: AT&T INTELLECTUAL PROPERTY I, L.P., Atlanta, GA (US)

(72) Inventors: Noemi Derzsy, New York, NY (US); Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1011 days.

(21) Appl. No.: 17/652,268

(22) Filed: Feb. 23, 2022

(65) Prior Publication Data
US 2023/0267362 A1    Aug. 24, 2023

(51) Int. Cl.
*G06N 20/00*    (2019.01)
*G06N 5/022*    (2023.01)

(52) U.S. Cl.
CPC ............. *G06N 20/00* (2019.01); *G06N 5/022* (2013.01)

(58) Field of Classification Search
CPC ......... G06N 20/00; G06N 5/022; G06N 20/20
See application file for complete search history.

(56) References Cited

U.S. PATENT DOCUMENTS

| | | | |
|---|---|---|---|
| 11,809,841 B1* | 11/2023 | Zhang | G06F 8/33 |
| 2016/0132487 A1* | 5/2016 | Nauze | G06F 40/40 |
| | | | 704/4 |
| 2018/0314975 A1* | 11/2018 | Zang | G06N 20/20 |
| 2018/0364985 A1* | 12/2018 | Liu | G06F 8/36 |
| 2021/0081848 A1* | 3/2021 | Polleri | G06F 11/3409 |
| 2022/0036610 A1* | 2/2022 | Wang | G06N 5/00 |
| 2022/0172099 A1* | 6/2022 | Das | G06N 20/00 |
| 2022/0269982 A1* | 8/2022 | Saha | G06N 20/00 |
| 2023/0177368 A1* | 6/2023 | Lee | G06N 5/01 |
| | | | 706/45 |

* cited by examiner

Primary Examiner — Chau T Nguyen
Assistant Examiner — Maxwell August Ludwikowski

(57) ABSTRACT

A method includes obtaining descriptive information for a first machine learning project, identifying, based on the descriptive information, a plurality of past machine learning projects which are similar to the first machine learning project, retrieving digital documents that describe the bias evaluation pipelines that were used to evaluate the plurality of past machine learning projects, detecting a common bias evaluation pipeline step among at least a subset of the digital documents, extracting, from the subset, a snippet of machine-executable code that corresponds to the common bias evaluation pipeline step, modifying the snippet of machine-executable code with use case data that is specific to the first machine learning project to generate modified machine-executable code, and generating a proposed bias evaluation pipeline for evaluating the first machine learning project, wherein the proposed bias evaluation pipeline includes the modified machine-executable code.

20 Claims, 4 Drawing Sheets

300

```
1  from bias_eval_package.proxy_feature_detection  import detect_proxy_feature
2  sensitive_feature = 'AGE'
3
4  variable_1 = a
5  variable_2 = b
6  df_processed = detect_proxy_feature(df, variable_1, variable_2)
```

302

```
1  from bias_eval_package.bias_mitigation  import bias_mitigation_algorithm
```

304

```
1  ret_value, processed_metrics = bias_mitigation_algorithm(
2    attribute_1 = 'F'
3    attribute_2 = 'M'
4    attribute_x = 'abc'
5    attribute_y = 'xyz')
```

FIG. 3

AUTOMATING BIAS EVALUATION FOR MACHINE LEARNING PROJECTS

The present disclosure relates generally to machine learning, and relates more particularly to devices, non-transitory computer-readable media, and methods for automating bias detection methodologies for evaluating machine learning projects.

BACKGROUND

Machine learning is a subset of artificial intelligence encompassing computer algorithms whose outputs improve with experience. A set of sample or "training" data may be provided to a machine learning algorithm, which may learn patterns in the training data that can be used to build a model that is capable of making predictions or decisions (outputs) based on a set of inputs (e.g., new data). Machine learning models may be used to automate the performance of repeated tasks, to filter emails, to provide navigation for unmanned vehicles, and to perform numerous other tasks or actions.

SUMMARY

The present disclosure broadly discloses methods, computer-readable media, and systems for automating bias detection methodologies for evaluating machine learning projects by building bias evaluation pipelines that reuse machine-executable code from previous bias evaluation pipelines. In one example, a method performed by a processing system including at least one processor comprises obtaining descriptive information for a first machine learning project, identifying, based on the descriptive information, a plurality of past machine learning projects which are detected to be similar to the first machine learning project, retrieving a plurality of digital documents, wherein each digital document of the plurality of digital documents describes a bias evaluation pipeline that was used to evaluate a different past machine learning project of the plurality of machine learning projects, detecting a common bias evaluation pipeline step among at least a subset of the plurality of digital documents, extracting, from the subset of the plurality of digital documents, a sample of machine-executable code that corresponds to the common bias evaluation pipeline step, modifying the sample of machine-executable code with use case data that is specific to the first machine learning project to generate modified machine-executable code, and generating a proposed bias evaluation pipeline for evaluating the first machine learning project, wherein the proposed bias evaluation pipeline includes the modified machine-executable code.

In another example, a non-transitory computer-readable medium may store instructions which, when executed by a processing system including at least one processor, cause the processing system to perform operations. The operations may include obtaining descriptive information for a first machine learning project, identifying, based on the descriptive information, a plurality of past machine learning projects which are detected to be similar to the first machine learning project, retrieving a plurality of digital documents, wherein each digital document of the plurality of digital documents describes a bias evaluation pipeline that was used to evaluate a different past machine learning project of the plurality of machine learning projects, detecting a common bias evaluation pipeline step among at least a subset of the plurality of digital documents, extracting, from the subset of the plurality of digital documents, a sample of machine-executable code that corresponds to the common bias evaluation pipeline step, modifying the sample of machine-executable code with use case data that is specific to the first machine learning project to generate modified machine-executable code, and generating a proposed bias evaluation pipeline for evaluating the first machine learning project, wherein the proposed bias evaluation pipeline includes the modified machine-executable code.

In another example, a device may include a processing system including at least one processor and a non-transitory computer-readable medium storing instructions which, when executed by the processing system, cause the processing system to perform operations. The operations may include obtaining descriptive information for a first machine learning project, identifying, based on the descriptive information, a plurality of past machine learning projects which are detected to be similar to the first machine learning project, retrieving a plurality of digital documents, wherein each digital document of the plurality of digital documents describes a bias evaluation pipeline that was used to evaluate a different past machine learning project of the plurality of machine learning projects, detecting a common bias evaluation pipeline step among at least a subset of the plurality of digital documents, extracting, from the subset of the plurality of digital documents, a sample of machine-executable code that corresponds to the common bias evaluation pipeline step, modifying the sample of machine-executable code with use case data that is specific to the first machine learning project to generate modified machine-executable code, and generating a proposed bias evaluation pipeline for evaluating the first machine learning project wherein the proposed bias evaluation pipeline includes the modified machine-executable code.

In all of the above examples, the first machine learning project may be evaluated for bias using the proposed bias evaluation pipeline, and a digital document may be created that includes the proposed bias evaluation pipeline, the machine-executable code corresponding to the proposed bias evaluation pipeline, and an outcome of the evaluation of the first machine learning project. The digital document may then be stored with the plurality of digital documents. By creating and storing these digital documents as machine learning projects are evaluated for bias, a constantly evolving repository of bias evaluation knowledge can be built and enhanced. As this bias evaluation knowledge grows, the accuracy with which bias can be detected in future machine learning projects can improve, and emerging patterns can be detected more quickly.

BRIEF DESCRIPTION OF THE DRAWINGS

The teachings of the present disclosure can be readily understood by considering the following detailed description in conjunction with the accompanying drawings, in which:

FIG. 3 illustrates a plurality of examples of snippets of machine-executable code which may correspond to different steps of a bias evaluation pipeline.

To facilitate understanding, similar reference numerals have been used, where possible, to designate elements that are common to the figures.

DETAILED DESCRIPTION

Figure 1:
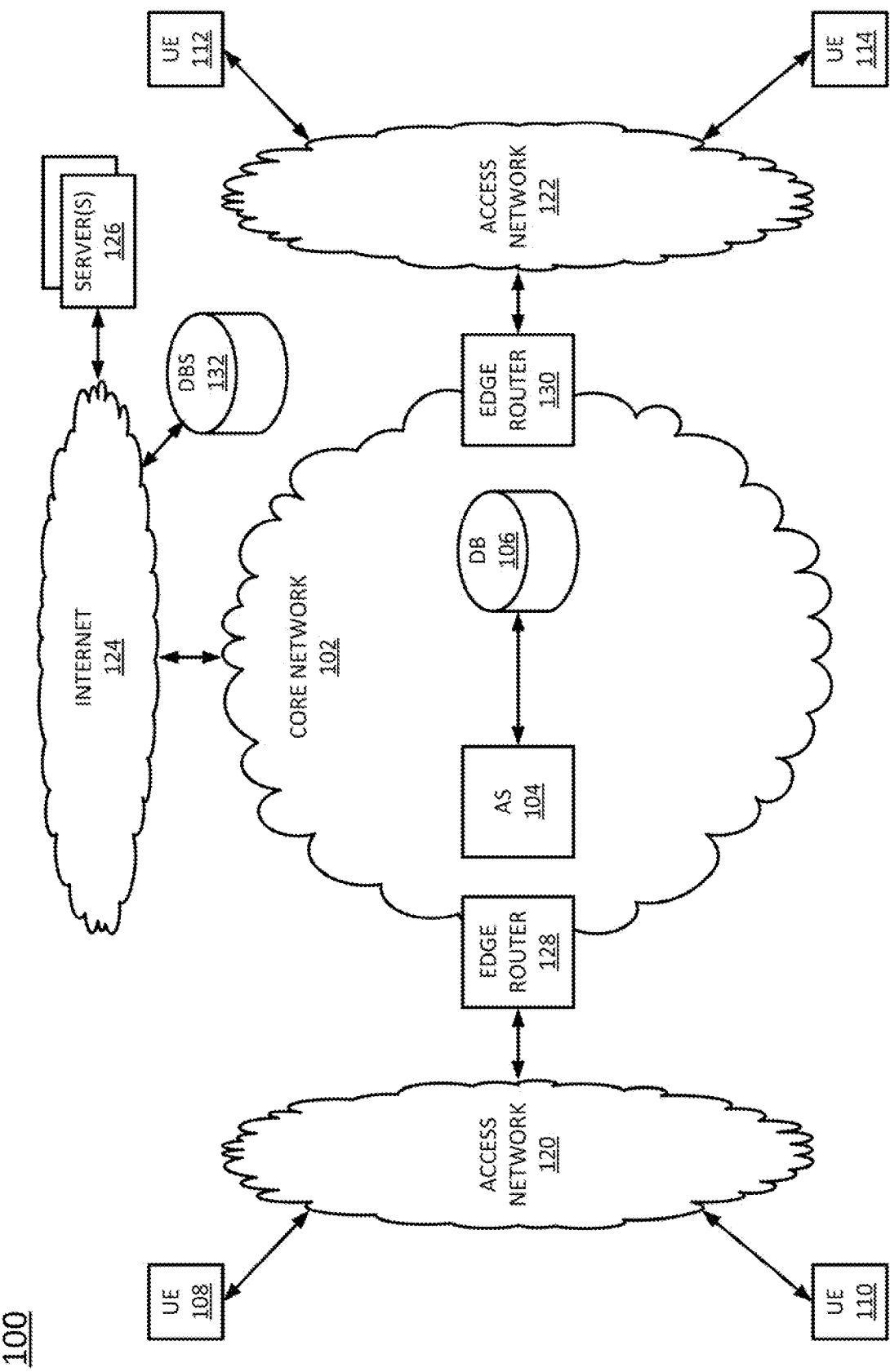
FIG. 1 illustrates an example system in which examples of the present disclosure for automating bias detection methodologies for evaluating machine learning projects may operate.

The present disclosure broadly discloses methods, computer-readable media, and systems for automating bias detection methodologies for evaluating machine learning projects. As discussed above, machine learning models are trained using a set of training data to make predictions or decisions (outputs) based on a set of inputs (e.g., new data). However, in some cases, the machine learning outputs may unintentionally perpetuate bias. Bias can be introduced in many stages of the development of a machine learning model, including data collection, data pre-processing, feature engineering, data split or selection, model training, model evaluation, and/or other stages. For instance, misrepresentation of aspects of a sample or group of samples used for training (where the misrepresentation may be due to biases of the human who labeled the samples, biases in the process used to generate the samples, systemic reasons, and/or other causes) may lead to machine learning outputs that can perpetuate and/or introduce biases.

As an example, it has been shown that highly unrepresentative images of particular segments of the population can be extracted from the Internet using machine learning models. As an example, a particular computer vision model that was designed to generate full-body images of individuals based on input facial images was shown to treat male subjects differently from female subjects. More specifically, when presented with a female facial image as an input, more than fifty percent of the output images generated by the model depicted the subjects in a state of under-dress relative to the output images generated based on male facial images (which were more likely to depict the subjects wearing professional attire such as suits). Misrepresentation of images of minorities contributes to existing historical racial and gender biases and runs the risk of perpetuating these biases (e.g., due to the false trust which may be engendered in machine learning predictions).

Thus, endeavors that rely on machine learning projects have a vested interest in ensuring that any biases in their machine learning projects are minimized to the greatest extent. Unfortunately, the individuals associated with these endeavors may have little to no experience with bias evaluation. For instance, even many machine learning experts do not necessarily possess bias expertise, and not all users of machine learning models will be machine learning experts. Enlisting the assistance of individuals who do possess bias expertise to evaluate all machine learning projects within an endeavor can be costly from a monetary, time, and personnel perspective.

Examples of the present disclosure provide an automatable framework for evaluating machine learning projects to detect and mitigate bias. In one example, information about a machine learning project to be evaluated may be used to identify past machine learning projects that were evaluated for bias (where the past machine learning models have been tested for bias and may or may not have been modified to mitigate any detected bias). Snippets of the machine-executable code that were used to evaluate the past machine learning projects may be extracted, tailored to the specific use case of the machine learning project to be evaluated, and incorporated into a bias evaluation pipeline for the machine learning project to be evaluated. The framework is automatable in the sense that snippets of the machine-executable code may be identified and recommended for reuse in an automated fashion. However, it is understood that human intervention may be needed to confirm that recommended snippets of the machine-executable code can in fact be reused and tailored to the specific use case of the machine learning project to be evaluated. In addition, human intervention may result in modifications to one or more recommended snippets of the machine-executable code.

In further examples, each time bias evaluation is performed for a machine learning project, a "notebook" detailing the bias evaluation may be generated. The notebook may comprise a digital document describing, for example, the bias evaluation pipeline that was used to evaluate the machine learning project, the machine-executable code for carrying out the steps of the bias evaluation pipeline, and/or the result of the bias evaluation pipeline (e.g., areas where potential bias were detected and what mitigation steps, if any, were taken). The machine-executable code may, in some cases, be annotated with non-code or non-executable information describing the machine learning project (e.g., use case, models, input features of the models, target output of the models, etc.). The notebook may be saved in a repository of similarly generated notebooks, which allows the machine-executable code to be reused for future bias evaluation pipelines, thereby simplifying and speeding future bias evaluation tasks. The collective knowledge stored in the repository may also be mined for patterns and frequent paths that emerge in the bias evaluation flow for specific machine learning projects and/or use cases.

Thus, examples of the present disclosure may allow endeavors that lack bias expertise to perform bias evaluation in a reliable and cost effective manner by making use of the notebooks disclosed herein. Moreover, examples of the present disclosure may be enhanced by incorporating the expertise of bias experts, who may refine the snippets of machine-executable code stored in the notebooks in order to provide greater confidence to the bias evaluation framework and to potentially improve the quality of the snippets of machine-executable code.

Within the context of the present disclosure, a "machine learning project" is understood to refer to a software system that includes training and testing data and at least one machine learning model that generates a set of predictions in response to new input data, where the machine learning model is to be applied for a specific use (e.g., narrowing down a large pool of potential job candidates to a smaller group, selecting applicants for college admission, etc.). Within the context of the present disclosure, a "past machine learning project" is understood to refer to a machine learning project that has already been evaluated for bias and may or may not have been modified to mitigate any detected bias. A notebook as described above may have been generated and saved for the past machine learning project. Within the context of the present disclosure, a "snippet" of machine-executable code is understood to refer to a small region (e.g., a defined operative unit) of reusable machine code. These and other aspects of the present disclosure are discussed in greater detail below in connection with the examples of FIGS. 1-4.

To further aid in understanding the present disclosure, FIG. 1 illustrates an example system 100 in which examples of the present disclosure for automating bias detection methodologies for evaluating machine learning projects may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to provide guidance and feedback to the AS 104, which may be configured to evaluate a machine learning model for bias by reusing portions of machine-executable code from the bias evaluation pipelines of previous machine learning models, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 4:
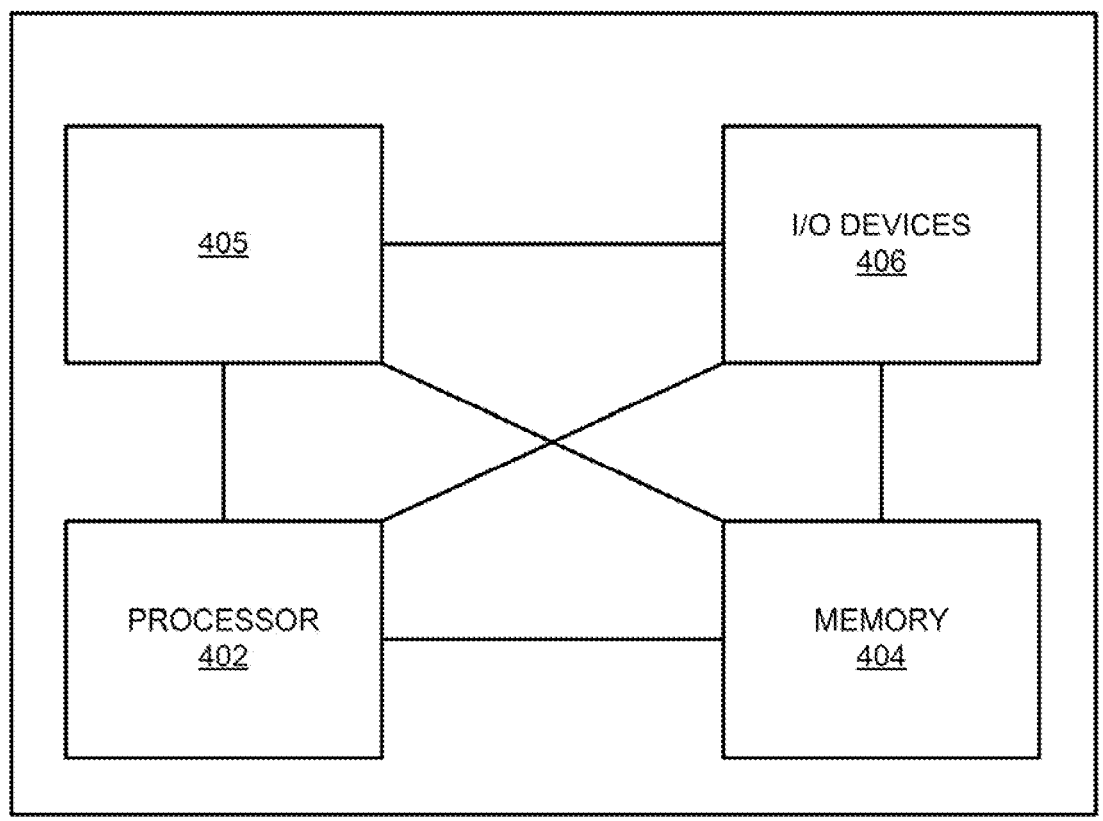
FIG. 4 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for automating bias detection methodologies for evaluating machine learning projects, as described herein. The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 104 may be configured to automate bias detection methodologies for evaluating a machine learning project by building a tailored bias evaluation pipeline that reuses snippets of code extracted from the bias evaluation pipelines of past (i.e., previously evaluated) machine learning projects. In particular, the AS 104 may be configured to identify past machine learning projects which share similarities with a machine learning project to be evaluated. The AS 104 may be further configured to mine the bias evaluation pipelines used to evaluate the past machine learning projects for common steps or patterns which may also be pertinent to the machine learning project to be evaluated. The AS 104 may extract snippets of machine-executable code associated with the common steps or patterns from the bias evaluation pipelines, and may recommend the snippets of machine-executable code for reuse in evaluating the machine learning project to be evaluated. The AS 104 may also recommend portions of machine-executable code that were used to evaluate similar past machine learning projects, but which are not associated with any detected common steps or patterns.

The AS 104 may be further configured to build a bias evaluation pipeline for the machine learning project to be evaluated. The AS 104 may build the bias evaluation pipeline for the machine learning project to be evaluated under the direction of a human user, who may modify one or more recommended snippets of machine-executable code with data that is tailored to the machine learning project to be evaluated. The AS 104 may further execute the bias evaluation pipeline in accordance with the machine-executable code, and may generate a bias evaluation output that indicates one or more potential sources of bias in the machine learning project to be evaluated. The AS 104 may further generate a "notebook" for the machine learning project to be evaluated, where the notebook includes at least the bias evaluation pipeline, the machine-executable code encoding the bias evaluation pipeline, and the bias evaluation output.

The AS 104 may be in communication with at least one DB 106. In one example, the DB 106 may store a plurality of notebooks, where each notebook is associated with a past machine learning project. Thus, each notebook may contain, for an associated past machine learning project, metadata about the associated past machine learning project (e.g., use case, input values, target output, etc.), the bias evaluation pipeline that was executed to evaluate the associated past machine learning project, the machine-executable code encoding the bias evaluation pipeline, and the bias evaluation output (i.e., outcome of the bias evaluation pipeline). The plurality of notebooks may include notebooks that were generated by the AS 104 and/or by other processing systems (e.g., servers 126 or other systems). Thus, the AS 104 may retrieve existing notebooks (i.e., associated with past machine learning projects) from the DB 106 for reuse in building new bias evaluation pipelines and may also store newly generated notebooks in the DB 106.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for automating bias detection methodologies for evaluating machine learning projects, as described herein. One example method for automating bias detection methodologies for evaluating machine learning projects is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. In a further example, the DB 106 may include a plurality of separate databases, where each database may be associated with a different enterprise or endeavor. Moreover, the plurality of separate databases may be geographically distributed. Thus, these and other modifications are all contemplated within the scope of the present disclosure.

Figure 2:
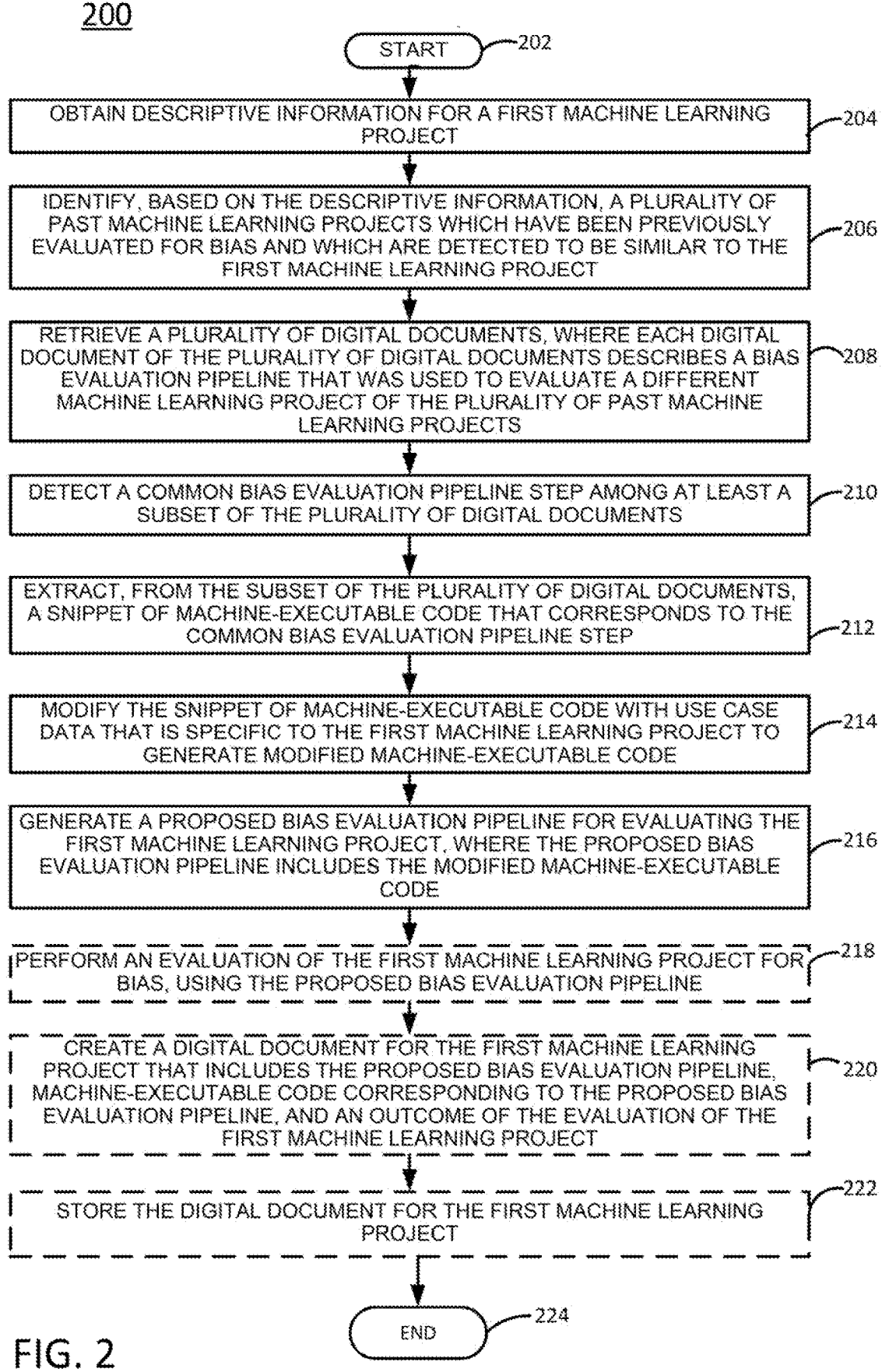
FIG. 2 illustrates a flowchart of an example method for automating bias detection methodologies for evaluating machine learning projects, in accordance with the present disclosure.

FIG. 2 illustrates a flowchart of an example method 200 for automating bias detection methodologies for evaluating machine learning projects, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system in an Internet service provider network, such as processing system 402.

The method 200 begins in step 202 and proceeds to step 204. In step 204, the processing system may obtain descriptive information for a first machine learning project (i.e., a machine learning project to be evaluated for bias). In one example, the descriptive information may describe parameters of the first machine learning project, such at least one of: the use case of the first machine learning project, input features of the first machine learning project, a target output of the first machine learning project, and/or other parameters. In one example, the descriptive information may be provided by a human user who inputs the descriptive information (e.g., by text, spoken utterances, or other means) into fields of a profile or survey (which may be provided via a web portal or graphical user interface of an application). In another example, the human user may upload a file containing the first machine learning project, and the processing system may parse the file for metadata describing the parameters of the first machine learning project.

In step 206, the processing system may identify, based on the descriptive information obtained in step 204, a plurality of past machine learning projects (i.e., including at least a second machine learning project) which have been previously evaluated for bias and which are detected to be similar to the first machine learning project. The plurality of past machine learning projects may be identified in one or more of a plurality of ways.

For instance, in one example, descriptive information about the first machine learning project which is provided in the form of input to fields of a profile or survey may be matched to corresponding fields associated with profiles or surveys of past machine learning projects. As an example, a "use case" field associated with the first machine learning project may contain the input "college admissions." A second (past) machine learning project may be identified as similar to the first machine learning project, based on a "use case" field associated with the second machine learning project also containing the term "college admissions" (or a semantically related term, such as "university admissions" or "college application processing"). In another example, a second (past) machine learning project may be identified as similar to the first machine learning project based on a match between metadata tags associated with the first machine learning project and metadata tags associated with the second machine learning project. As with the field inputs, two (or more) metadata tags may be considered to "match" when the tags match exactly or match semantically.

In another example, at least some of the plurality of past machine learning projects may be identified with guidance from the human user who provided the descriptive information for the first machine learning project. For instance, the human user may perform a search of a database (e.g., DB 106) using keywords, metadata, or other information in order to locate at least some of the plurality of past machine learning projects. In another example, the database may store a searchable index of past machine learning projects that have previously been evaluated for bias, and the human user may traverse the index, e.g., by drilling down through one or more categories, in order to locate at least some of the plurality of past machine learning projects.

It should be noted that although step 206 describes identifying a plurality of past machine learning projects which are detected to be similar to the first machine learning project, in further examples, the processing system may also identify past machine learning projects which are not similar to (or do not meet at least a threshold similarity with respect to) the first machine learning project. As discussed in further detail below, even past machine learning projects which are not similar to the first machine learning project may prove useful in evaluating the first machine learning project for bias.

In step 208, the processing system may retrieve a plurality of digital documents (or "notebooks"), where each digital document of the plurality of digital documents describes a bias evaluation pipeline that was used to evaluate a different past machine learning project of the plurality of past machine learning projects. In one example, each digital document may further describe machine-executable code for carrying out steps of the bias evaluation pipeline and/or a result of the execution of the bias evaluation pipeline (e.g., areas where potential bias were detected).

In one example, the plurality of digital documents may be stored with other digital documents corresponding to previously evaluated past machine learning projects in a repository (e.g., a database such as DB 106 of FIG. 1) that is accessible by the processing system. In one example, the repository may comprise a plurality of databases which may be geographically distributed over a plurality of locations. The repository may be proprietary to a particular endeavor or enterprise. For instance, an enterprise such as a corporation, a university, or the like may maintain its own database of previously evaluated machine learning projects which have been utilized by the enterprise in the past. It is likely that the enterprise may tend to deploy machine learning projects tailored for use cases in a limited set of fields pertaining to the enterprise's business. For instance, most machine learning projects deployed in connection with a telecommunications service provider's business may relate to 5G infrastructure and deployment, subscriber billing, fraud detection, subscriber contact, and other related use cases. By maintaining a repository of digital documents relating to past machine learning projects that are specifically pertinent to the enterprise's business, this may increase the likelihood of the enterprise reusing information relating to those past machine learning projects (as the enterprise's future machine learning projects are likely to pertain to the same or similar use cases).

In another example, a repository may be maintained by a service provider who serves multiple enterprises or users. In this case, users may subscribe to services provided by the service provider, which may include access to the repository for the purposes of evaluating machine learning projects for bias.

In step 210, the processing system may detect a common bias evaluation pipeline step (or series of steps) among at least a subset of the plurality of digital documents. For instance, in one example, the processing system may use natural language processing techniques (or other analysis techniques) to detect that the bias evaluation pipelines of two or more of the digital documents contain the same step or series of steps. As an example, two or more bias evaluation pipelines for evaluating past machine learning projects that determine whether to grant college admission may include a step that identifies how much weight the machine learning models that are part of the machine learning projects afford to standardized test scores.

As indicated above, in one example, two or more bias evaluation pipelines may share at least a single common step. In some cases, a series of two or more steps (i.e., all the same individual steps performed in the same order, such as Step A>Step B>Step C) may be common to two or more bias evaluation pipelines. The processing system is capable of detecting instances in which series of steps are common to two or more bias evaluation pipelines in the plurality of digital documents. In further examples, the processing system may be capable of detecting patterns in the bias evaluation pipelines which may not necessarily require that two or more bias evaluation pipelines utilize exactly the same series of steps. For instance, a pattern may require that two or more common steps be performed in the same order, but may allow for different intervening steps to be performed between the two or more common steps. As an example, a pattern may require that Step B be performed after Step A, and that Step C be performed after Step B. In this case, a first bias evaluation pipeline of Step A>Step X>Step B>Step C and a second bias evaluation pipeline of Step A>Step B>Step Y>Step C may both utilize the specified pattern despite not sharing exactly the same series of steps.

In one example, the processing system may detect a plurality of common bias evaluation pipeline steps (and/or series of steps and/or patterns) and may rank the plurality of common bias evaluation steps. In one example, the plurality of bias evaluation pipeline steps may be ranked in order from most frequently appearing (e.g., greatest number of bias evaluation pipelines to which a step is common) to least frequently appearing (e.g., fewest number of bias evaluation pipelines to which a step is common). Thus, a first common bias evaluation step that is common to ten bias evaluation pipelines would be ranked more highly than a second common bias evaluation step that is common to three bias evaluation pipelines.

In step 212, the processing system may extract, from the subset of the plurality of digital documents, a snippet of machine-executable code that corresponds to the common bias evaluation pipeline step. In one example, the common bias evaluation pipeline step for which the machine-executable code is extracted may be one of the n top-ranked common bias evaluation pipeline steps, as described above. Thus, the common bias evaluation pipeline step for which the machine-executable code is extracted may be one of the most commonly recurring bias evaluation pipeline steps within the plurality of past machine learning projects.

As discussed above, the common bias evaluation pipeline step may comprise a single common step, may comprise one step in a common series of steps, or may comprise one step in a common pattern. Where the common bias evaluation pipeline step comprises one step of a common series of steps or a common pattern, the processing system may extract a snippet of machine-executable code for the entire common series of steps or common pattern (where the extracted snippet of machine-executable code will necessarily include at least a snippet of machine-executable code that corresponds to the common bias evaluation pipeline step). FIG. 3, for instance, illustrates a plurality of examples of snippets 300, 302, and 304 of machine-executable code which may correspond to different steps of a bias evaluation pipeline.

In one example, the processing system may additionally extract, from the first digital document or from a second, different digital document of the plurality of digital documents, another snippet of machine-executable code corresponding to a bias evaluation pipeline step that the processing system suggests for inclusion in a bias evaluation pipeline for evaluating the first machine learning project. In one example, the suggested bias evaluation pipeline step may be a bias evaluation pipeline step that is not included within the n top-ranked common bias evaluation pipeline steps. However, the processing system may identify other reasons for suggesting inclusion of the suggested bias evaluation pipeline step. For instance, the suggested bias evaluation pipeline step may comprise a bias evaluation pipeline step that was introduced relatively recently into the bias evaluation pipelines for the plurality of past machine learning projects. Thus, use of the suggested bias evaluation pipeline step may not yet be widespread enough for the suggested bias evaluation pipeline step to be ranked within the n top-ranked common bias evaluation pipeline steps. However, the suggested bias evaluation pipeline step may have demonstrated a high rate of success in detecting bias in past machine learning projects that are determined to share similarities with the first machine learning project.

In step 214, the processing system may modify the snippet of machine-executable code with use case data that is specific to the first machine learning project to generate modified machine-executable code. In one example, the use case data may include features intended to be provided as inputs to the first machine learning project. For instance, where data includes different features arranged by column, and each column includes a plurality of values for the corresponding feature, the use case data may include identifiers for the columns that are to be provided as input to the first machine learning project. As an example, if the first machine learning project is designed to select which applicants from among a pool of applicants to whom to grant college admission, and the available data includes a plurality of attributes (features) for the pool of applicants, the use case data or input features might include columns for "grade point average," "standardized test score," "class rank," "intended major," and the like.

In step 216, the processing system may generate a proposed bias evaluation pipeline for evaluating the first machine learning project, where the proposed bias evaluation pipeline includes the modified machine-executable code. In one example, the proposed bias evaluation pipeline may incorporate suggestions made by a human user. For instance, the human user may propose modifications to be made to the snippet of machine-executable code. The human user may also propose including additional snippets of machine-executable code not suggested by the processing system in the proposed bias evaluation pipeline, may propose removing suggested snippets of machine-executable code from the proposed bias evaluation pipeline, or may provide new machine-executable code (e.g., written by the human user) that were not used in any past evaluated machine learning projects.

In optional step 218 (illustrated in phantom), the processing system may perform an evaluation of the first machine learning project for bias, using the proposed bias evaluation pipeline. For instance, the processing system may take as input the first machine learning project, may perform the steps of the proposed bias evaluation pipeline (by executing operations under the direction of the machine-executable code included in the proposed bias evaluation pipeline) on the first machine learning project and may generate an output based on performance of the steps. The output may comprise an outcome of the evaluation and may indicate portions of the first machine learning project where potential bias was detected.

For instance, bias may be detected in some of the input features of a machine learning model on which the first machine learning project relies, in algorithms used by a machine learning model on which the first machine learning project relies to process the input features, or in other portions of the first machine learning project. In one example, the outcome of the evaluation may include suggestions for minimizing detected potential bias (e.g., additional input features to include, input features to exclude, auxiliary sources of input features, adjustments to algorithms, etc.). In one example, the suggestions for minimizing detected potential bias may be based on adjustments that were made to at least some of the plurality of past machine learning projects.

In one example, the evaluation of the first machine learning project for bias may be conducted in accordance with any mechanized, code-based bias evaluation framework. It should be noted that the bias evaluation framework used to conduct the evaluation of the first machine learning project for bias need not necessarily be the same bias evaluation framework that was used to evaluate the plurality of past machine learning projects for bias previously (as long as the bias evaluation framework(s) used to evaluate the plurality of past machine learning projects was/were also mechanized, code-based bias evaluation frameworks).

In optional step 220 (illustrated in phantom), the processing system may create a digital document (e.g., a "notebook") for the first machine learning project that includes the proposed bias evaluation pipeline, machine-executable code corresponding to the proposed bias evaluation pipeline (including the modified machine-executable code), and the outcome of the evaluation of the first machine learning project (as performed in step 218). The digital document may also include non-code or non-executable annotations. Thus, the contents of the digital document for the first machine learning project may be similar to the contents of the digital documents for the plurality of past machine learning projects, described above. Similarly to the digital documents for the plurality of past machine learning projects, the digital document for the first machine learning project may also be made available for use in evaluating future machine learning projects, as discussed in further detail below.

In optional step 222 (illustrated in phantom), the processing system may store the digital document for the first machine learning project. In one example, the digital document for the first machine learning project may be stored in the same data source (e.g., repository) in which the digital documents for the plurality of past machine learning projects are stored. Thus, the digital document for the first machine learning project may enhance the knowledge base that is used to evaluate future machine learning projects for bias, thereby allowing emerging patterns to be detected more quickly and more reliably.

The method 200 may end in step 224.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, the method 200 leverages knowledge of past bias evaluation processes to improve the bias evaluation process for new machine learning projects. Users are able to reuse snippets of machine-executable code used to evaluate past machine learning projects that are similar to the new machine learning projects while also tailoring the snippets of machine-executable code to the new machine learning projects' use cases. This significantly speeds the bias evaluation process without sacrificing the reliability of the results, and also makes the bias evaluation process more accessible for novice or non-expert users. Thus, users are more likely to evaluate their machine learning projects for bias, which will minimize the influence of bias in machine learning overall. Moreover, even expert users may find their bias evaluation tasks to be improved in terms of personnel and financial costs. Expert users may also provide modifications to the snippets of machine-executable code which may improve the bias evaluation process for all users.

As more machine learning projects are evaluated using this framework, and as the results of those evaluations are stored for future reference, the knowledge base will grow, and the ability to detect even previously unknown instances of bias may be improved. For instance, by utilizing the bias evaluation framework embodied in the method 200 within a single enterprise (where projects utilizing machine learning models may tend to be highly similar), the enterprise may be able to make better use of the knowledge base at each stage of the bias evaluation pipeline, which may eventually reduce the time needed to perform bias evaluation for machine learning projects within the enterprise. Moreover, the enterprise may be more likely to evaluate their machine learning projects for bias knowing that the evaluation process has access to an evolving knowledge base for machine learning projects whose use cases fall within the same or similar narrow set of categories.

Moreover, it should be noted that although the method 200 is described as reusing snippets of machine-executable code used to evaluate past machine learning projects which are similar to a machine learning project being evaluated for bias, in some examples, code snippets of machine executable code used to evaluate past machine learning projects that are not similar to (or do not meet a threshold similarity with respect to) the machine learning project being evaluated for bias may also be reused. For instance, the bias evaluation pipelines used to evaluate some dissimilar past projects may utilize generic steps that may be useful in evaluating a broad range of machine learning projects. As an example, a first machine learning project designed to predict real estate prices may perform some generic calculations relating to local cost of living. These calculations may be also be useful in a second machine learning project designed to predict hotel rates. Thus, steps of the bias evaluation pipeline used to evaluate the first machine learning project may also be useful in evaluating the second machine learning project for bias.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for automating bias detection methodologies for evaluating machine learning projects, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for automating bias detection methodologies for evaluating machine learning projects (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for automating bias detection methodologies for evaluating machine learning projects (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
obtaining, by a processing system including at least one processor, descriptive information for a first machine learning project;
identifying, by the processing system and based on the descriptive information, a plurality of past machine learning projects which are detected to be similar to the first machine learning project;
retrieving, by the processing system, a plurality of digital documents, wherein each digital document of the plurality of digital documents describes a bias evaluation pipeline that was used to evaluate a different past machine learning project of the plurality of past machine learning projects;
detecting, by the processing system, a common bias evaluation pipeline step among at least a subset of the plurality of digital documents, wherein the detecting comprises using a natural language processing technique to detect the common bias evaluation pipeline step;
extracting, by the processing system from the subset of the plurality of digital documents, a snippet of machine-executable code that corresponds to the common bias evaluation pipeline step;
modifying, by the processing system, the snippet of machine-executable code with use case data that is specific to the first machine learning project to generate modified machine-executable code; and
generating, by the processing system, a proposed bias evaluation pipeline for evaluating the first machine learning project, wherein the proposed bias evaluation pipeline includes the modified machine-executable code.

2. The method of claim 1, wherein the descriptive information describes at least one of: a use case of the first machine learning project, input features of a machine learning model used in the first machine learning project, or a target output of the machine learning model.

3. The method of claim 1, wherein the plurality of digital documents is stored with other digital documents corresponding to other machine learning projects which have been previously evaluated for bias in a repository that is accessible by the processing system.

4. The method of claim 1, wherein the common bias evaluation pipeline step is one step in a series of bias evaluation pipeline steps that is common to the subset of the plurality of digital documents.

5. The method of claim 1, wherein the common bias evaluation pipeline step is one step in a pattern that is common to the subset of the plurality of digital documents.

6. The method of claim 5, wherein the pattern includes a second step that is also common to the subset of the plurality of digital documents, the second step being performed after the one step in all of the plurality of digital documents within the subset, but wherein different intervening steps are performed between the one step and the second step in at least two of the plurality of digital documents within the subset.

7. The method of claim 1, wherein the detecting comprises detecting a plurality of common bias evaluation pipeline steps and ranking the plurality of common bias evaluation steps.

8. The method of claim 7, wherein the plurality of common bias evaluation pipeline steps is ranked in order from most frequently appearing to least frequently appearing.

9. The method of claim 8, wherein the common bias evaluation pipeline step is included within a set of n top-ranked common bias evaluation pipeline steps of the plurality of common bias evaluation steps.

10. The method of claim 9, wherein the extracting further comprises extracting a bias evaluation pipeline step that is not included within the set of n top-ranked common bias evaluation pipeline steps.

11. The method of claim 1, wherein the use case data comprises a feature intended to be provided as an input to a machine learning model used in the first machine learning project.

12. The method of claim 1, wherein the proposed bias evaluation pipeline incorporates a suggestion made by a human user.

13. The method of claim 12, wherein the suggestion is at least one of: a modification to the snippet of machine-executable code or an additional snippet of machine-executable code to include in the proposed bias evaluation pipeline.

14. The method of claim 1, further comprising:
performing, by the processing system, an evaluation of the first machine learning project for bias, using the proposed bias evaluation pipeline.

15. The method of claim 14, wherein the performing generates an output that indicates at least one portion of the first machine learning project where a potential bias was detected.

16. The method of claim 15, wherein the output further includes a suggestion for minimizing the potential bias that was detected.

17. The method of claim 16, wherein the suggestion is based on an adjustment that was made to at least one machine learning project of the subset of the plurality of past machine learning projects.

18. The method of claim 15, further comprising:
creating, by the processing system, a digital document for the first machine learning project that includes the proposed bias evaluation pipeline, machine-executable code corresponding to the proposed bias evaluation pipeline, and the output; and
storing, by the processing system, the digital document for the first machine learning project in a repository with the plurality of digital documents.

19. A non-transitory computer-readable medium storing instructions which, when executed by a processing system including at least one processor, cause the processing system to perform operations, the operations comprising:
obtaining descriptive information for a first machine learning project;
identifying, based on the descriptive information, a plurality of past machine learning projects which are detected to be similar to the first machine learning project;
retrieving a plurality of digital documents, wherein each digital document of the plurality of digital documents describes a bias evaluation pipeline that was used to evaluate a different past machine learning project of the plurality of past machine learning projects;
detecting a common bias evaluation pipeline step among at least a subset of the plurality of digital documents, wherein the detecting comprises using a natural language processing technique to detect the common bias evaluation pipeline step;
extracting, from the subset of the plurality of digital documents, a snippet of machine-executable code that corresponds to the common bias evaluation pipeline step;
modifying the snippet of machine-executable code with use case data that is specific to the first machine learning project to generate modified machine-executable code; and
generating a proposed bias evaluation pipeline for evaluating the first machine learning project, wherein the proposed bias evaluation pipeline includes the modified machine-executable code.

20. A device comprising:
a processing system including at least one processor; and
a non-transitory computer-readable medium storing instructions which, when executed by the processing system, cause the processing system to perform operations, the operations comprising:
obtaining descriptive information for a first machine learning project;
identifying, based on the descriptive information, a plurality of past machine learning projects which are detected to be similar to the first machine learning project;
retrieving a plurality of digital documents, wherein each digital document of the plurality of digital documents describes a bias evaluation pipeline that was used to evaluate a different past machine learning project of the plurality of machine learning projects;
detecting a common bias evaluation pipeline step among at least a subset of the plurality of digital documents, wherein the detecting comprises using a natural language processing technique to detect the common bias evaluation pipeline step;
extracting, from the subset of the plurality of digital documents, a snippet of machine-executable code that corresponds to the common bias evaluation pipeline step;
modifying the snippet of machine-executable code with use case data that is specific to the first machine learning project to generate modified machine-executable code; and
generating a proposed bias evaluation pipeline for evaluating the first machine learning project, wherein the proposed bias evaluation pipeline includes the modified machine-executable code.

* * * * *